United States Patent [19]
Takano

[11] Patent Number: 5,612,979
[45] Date of Patent: Mar. 18, 1997

[54] SYNCHRONOUS CIRCUIT

[75] Inventor: Hideto Takano, Tokyo, Japan

[73] Assignee: NEC Corporation, Japan

[21] Appl. No.: 522,762

[22] Filed: Sep. 1, 1995

[30] Foreign Application Priority Data

Sep. 2, 1994 [JP] Japan .................................. 6-209503

[51] Int. Cl.[6] .................................................. H04L 7/00
[52] U.S. Cl. ........................ 375/354; 375/363; 375/365
[58] Field of Search .................................. 375/354, 357, 375/363, 365, 368, 369; 358/409, 413; 327/141

[56] References Cited

PUBLICATIONS

ISO/IEC 11172:3 1993 (E), pp. 70–71.

*Primary Examiner*—Stephen Chin
*Assistant Examiner*—Betsy P. Lee

*Attorney, Agent, or Firm*—Ostrolenk, Faber, Gerb & Soffen, LLP

[57] ABSTRACT

The invention provides a synchronous circuit which prevents occurrence of a step-out condition even when an error in padding occurs. The synchronous circuit is applied to a digital transmission system wherein the number of bits in a frame varies periodically and bit number information is included in a frame. Making use of the fact that the bit number information has a periodicity, bit number information for one period is generated by a padding bit generator based on information from a synchronism detector to prevent occurrence of a step-out condition caused by an error in received bit number information.

3 Claims, 8 Drawing Sheets

FIG. 4

| BIT RATE | LAYER 1 | BIT RATE | LAYER 2 |
|---|---|---|---|
| 32K | 147 | 32K | 49 |
| 64K | 147 | 48K | 49 |
| 96K | 49 | 56K | 7 |
| 128K | 147 | 64K | 49 |
| 160K | 147 | 80K | 49 |
| 192K | 49 | 96K | 49 |
| 224K | 21 | 112K | 7 |
| 256K | 147 | 128K | 49 |
| 288K | 49 | 160K | 49 |
| 320K | 147 | 192K | 49 |
| 352K | 147 | 224K | 7 |
| 384K | 49 | 256K | 49 |
| 416K | 147 | 320K | 49 |
| 448K | 21 | 384K | 49 |

FIG. 5

| FRAME No. | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
|---|---|---|---|---|---|---|---|---|---|---|---|---|---|---|---|---|---|---|---|---|---|---|---|---|---|
| PADDING VALUE | 0 | 1 | 1 | 1 | 1 | 1 | 1 | 1 | 1 | 1 | 1 | 1 | 1 | 1 | 1 | 1 | 1 | 0 | 1 | 1 | 1 | 1 | 1 | 1 | 1 |
| FRAME No. | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | |
| PADDING VALUE | 1 | 1 | 1 | 1 | 1 | 1 | 1 | 0 | 1 | 1 | 1 | 1 | 1 | 1 | 1 | 1 | 1 | 1 | 1 | 1 | 1 | 1 | 1 | 1 | |

SYNCHRONOUS CIRCUIT

BACKGROUND OF THE INVENTION

1. Field of the Invention

This invention relates to a synchronous circuit for a digital transmission system, and more particularly to a synchronous circuit for use with a bit stream wherein the number of bits in a frame varies periodically in order to keep a transmission rate fixed in average and each frame includes information of the bit number called padding.

2. Description of the Related Art

Various synchronous circuits of the type mentioned are conventionally known, and an exemplary one of such synchronous circuits is a synchronous circuit for the layers 1 and 2 of a bit stream according to a compression and decompression system for a digital audio signal standardized by the ISO/IEC 11172-3 (hereinafter referred to as MPEG/Audio system). Details of the MPEG (Moving Picture Experts Group)/Audio system are described in the standards mentioned above.

A frame of the MPEG/Audio system is roughly divided into two portions including a header portion and a data portion. The header portion includes information of a synchronism pattern, a layer, a bit rate Br, a sampling frequency Fs, a padding and so forth. The synchronism pattern is formed from successive 1s of 12 bits, and the layer represents what method from among three compression methods defined in the MPEG/Audio system has been used to compress the frame. The number of slots of the frame is calculated from the layer, the bit rate Br, the sampling frequency Fs and the padding. The slot number is normally given by an expression $(Br/N) \cdot (L/Fs)$, where N is the number of bits included in one slot, and L is the number of samples of the digital signal of the sampling frequency Fs included in one frame of the bit stream. The number of bits included in one slot is determined to be 32 bits for the layer 1, but 8 bits for the layers 2 and 3.

As an example, if the number of bits of one frame when the layer is 2, the bit rate Br is 192 kHz and the sampling frequency Fs is 48 kHz is calculated in accordance with the expression given above, then, $$(192 \times 10^3) \cdot (1,152/48 \times 10^3) = 4,608$$

where 1,152 is the number of samples of one channel of the digital audio signal included in one frame. In this instance, the number of bits of one frame is an integral number.

As another example, if the number of bits of one frame when the layer is 2, the bit rate is 192 kHz and the sampling frequency is 44.1 kHz is calculated, then, $$(192 \times 10^3) \cdot (1,152/44.1 \times 10^3) = 5,015.5120 \ldots$$

In this instance, the bit number of one frame is not an integral number. Meanwhile, in the layer 2 of the MPEG/Audio system, since one slot is determined to be 8 bits, the number of bits included in one frame must be a multiple of 8.

Therefore, frames each of which includes 5,008 bits or 5,016 bits, which are multiples of 8, are combined suitably so that an average bit number may be equal to 5,015.5102 . . . In the combining processing, a basic frame is first determined to include 5,008 bits, and an additional slot formed from 8 bits is defined. A frame which does not include the additional slot is formed from 5,008 bits, but another frame which includes the additional slot is formed from 5,016 bits. When the aforementioned padding is "0", the basic frame is selected, but when the padding is "1", the frame which includes the additional slot is selected. By selecting the padding values suitably between "0" and "1", the average bit number can be approximated to 5,015.5102 . . . which is a value between 5,008 and 5,016.

The factors upon which the slot numbers depend normally exhibit, upon high efficiency coding of successive digital audio signals, fixed values except the padding. However, the padding varies for each frame in order to approximate the average bit rate to a value designated by a bit rate value at the header portion. Since the length of a frame varies depending upon the padding value, also the interval between synchronism patterns varies.

Further, successive 1s of 12 bits which make the synchronism pattern may appear not only once, but may possibly appear also in the data portion.

Accordingly, it is not easy to detect a synchronism pattern of the bit stream described above, and a synchronism detection circuit designed for exclusive use is used for such detection.

FIG. 7 shows an example of a circuit for decompressing a compressed signal in synchronism with a bit stream. Referring to FIG. 7, the circuit shown includes a decompression processor 41 and a synchronism detector 42'. When the synchronism detector 42' detects a synchronizing bit train from a bit stream 10 inputted thereto, it outputs a start signal 11 to the decompression processor 41. Upon reception of the start signal 11, the decompression processor 41 performs decompression processing for the bit stream 10 in response to a clock signal 12 and outputs a PCM (pulse code modulation) signal 13. The synchronism detector 42' outputs a start signal 11 for each one frame, and the decompression processor 41 performs processing for one frame in response to each such start signal 11. Here, the synchronism detector 42' which is related to the present invention will be described in more detail.

An internal construction of the synchronism detector 42' is shown in FIG. 8. Referring to FIG. 8, the synchronism detector 42' shown includes a serial to parallel converter 42-1, a synchronism pattern detector 42-2, a selector 42-3, a header register 42-4, a frame counter 42-5, a header updating condition storage section 42-6, a synchronism discriminator 42-7 and a step-out discriminator 42-8.

In operation of the synchronism detector 42', the count value of the frame counter 42-5 is reset to 0, parallel data 27 which is an output signal of the serial to parallel converter 42-1 is reset to 0 and a header updating permission signal 20 is set in response to a reset signal 14.

The bit stream 10 is inputted as serial data to the synchronism detector 42' in synchronism with the clock signal 12, converted into parallel data 27 by the serial to parallel converter 42-1 and outputted to the synchronism pattern detector 42-2. The synchronism pattern detector 42-2 outputs a synchronism pattern detection signal 26 if a conformable value as data which forms a header including a synchronism pattern prescribed in accordance with the MPEG/Audio system is inputted thereto. The selector 42-3 selects one of the start signal 11 and the synchronism pattern detection signal 26 in response to the header updating permission signal 20. In particular, if the header updating permission signal 20 is in a set condition, then the synchronism pattern detection signal 26 is selected, but if the header updating permission signal 20 is in a reset condition, then the start signal 11 is selected. In an initial state, the header updating permission signal 20 is in a set condition, and consequently, the synchronism pattern detection signal 26 is selected and outputted as a latch signal 21 to the header register 42-4. In response to the latch signal 21, the header register 42-4 stores a layer, a bit rate, a sampling frequency and a padding which are outputted from the serial to parallel converter 42-1 and are values which define a frame length.

Further, in response to the latch signal 21, the frame counter 42-5 is reset, and counting of the number of clocks of the clock signal 12 is started. In the meantime, in response to the synchronism pattern detection signal 26, the header updating condition storage section 42-6 resets the header updating permission signal 20. After the header updating permission signal 20 is reset, a layer 22, a bit rate 23 and a sampling frequency 28 which are information necessary to determine the frame length to be outputted from the header register 42-4 are updated each time a start signal 11 is outputted.

The frame counter 42-5 calculates the number of bits of a frame from the layer 22, the bit rate 23, the sampling frequency 28 and a padding 24 outputted from the header register 42-4, and counts the clock signal 12 until the count value of it reaches the bit number.

It is to be noted that, when the sampling frequency is 32 kHz or 48 kHz, since the frame length always has a fixed value and no additional slot is involved, the padding value is ignored so that the counting end value of the frame counter 42-5 may not be influenced by an error in transmission of the padding value. After the frame counter 42-5 completes its counting processing of one frame, it outputs a counting end signal 25. When the counting end signal 25 and the synchronism pattern detection signal 26 are outputted simultaneously to the synchronism discriminator 42-7, the synchronism discriminator 42-7 outputs a start signal 11. Similar processing is performed also for the third and following frames, and a start signal is outputted if a counting end signal 25 is outputted simultaneously when a synchronism pattern is inputted as a bit stream.

If successive 1s of 12 bits are included by chance in the data portion and are detected as a synchronism pattern in error, then a meaningless value different from a frame length is substituted into the frame counter 42-5. Then, the probability that successive 1s of 12 bits may be inputted by chance at the time at which a counting end signal 25 is produced is very low. When a synchronism pattern detection signal 26 is not outputted simultaneously with a counting end signal 25, a step-out detection signal 29 is outputted from the step-out discriminator 42-8 and the header updating permission signal 20 to be outputted from the header updating condition storage section 42-6 is set, thereby returning to the initial condition. In short, when an erroneous synchronism pattern is detected as described above, a synchronous condition is lost once, and then a synchronism pattern is detected again.

In this manner, when a synchronous condition is established with an erroneous synchronism pattern, the synchronous condition is lost once and initialization is performed, but when a synchronous condition is established correctly, the synchronism pattern detection signal 26 is confirmed for each frame.

However, if, after a synchronous condition is established in the conventional synchronism detection circuit described above, an error in transmission occurs with the bit stream 10 and a synchronism pattern detection signal 26 is not outputted simultaneously with a counting end signal 25, then an initial condition is restored similarly to the case when an erroneous synchronism pattern is detected, and consequently, the synchronous condition is lost. When a synchronism pattern detection signal 26 is not outputted simultaneously with a counting end signal 25 in this manner, it is discriminated that an asynchronous or step-out condition is entered.

In order to reduce such step-out conditions caused by a transmission error as described above, such a general countermeasure to prevent a step-out condition may possibly be adopted wherein a discrimination of a step-out condition is made when the situation that a synchronism pattern detection signal 26 is not outputted simultaneously with a counting end signal 25 in this manner occurs successively two or more times. With the countermeasure, even if a synchronism pattern is not detected by an error, if another synchronism pattern is detected with a succeeding frame, then a synchronous condition is maintained.

However, if a header value necessary to determine a frame length is in error, then since the frame counter 42-5 outputs a counting end signal 25 with a value different from a frame length, the counting end signal 25 is produced at a time different from the time of the top of a next frame, resulting in loss of synchronism. In other words, even if the countermeasure described above is taken, a step-out condition is possibly entered as a result of an error in transmission.

Thus, the conventional synchronous circuit described above is disadvantageous in that, when an error in padding value which is information necessary to determine a frame length occurs on a transmission medium before a bit stream is transmitted to a reception circuit, since the number of bits or the number of slots of one frame is recognized in error, the output timing of a counting end signal 25 is displaced from a synchronism pattern detection signal 26, resulting in entering into a step-out condition.

SUMMARY OF THE INVENTION

It is an object of the present invention to provide a synchronous circuit which prevents occurrence of a step-out condition even when an error in padding occurs.

In order to attain the object described above, according to the present invention, there is provided a synchronous circuit, which comprises a synchronism detector including a synchronism pattern detector for detecting a synchronism pattern included in a bit stream of a bit rate Br formed from frames each composed of a plurality of slots as information units obtained by compression of a digital signal of a sampling frequency Fs by high efficiency coding, and a counter for counting a number of slots or a number of bits to a position of a synchronism pattern of a next frame based on frame length information included in a frame, the bit stream including, when a value S' given by $$S'=(Br/N)\cdot(L/Fs)$$

is an integral number, frames each of which includes a number S of slots which is equal to the value S', N being a number of bits included in one slot, L being a number of samples of the digital signal of the sampling frequency Fs included in one frame of the bit stream, the bit stream including, when the value S' is not an integral number, a combination of frames wherein frames each of which includes a number of slots equal to an integral part S" of the value S' and frames each of which includes a number of slots equal to a number S"+1 which is a sum of the integral part S" of the value S' and 1 are combined so that the bit stream has an average bit rate approximated to the bit rate Br, the bit stream including, for each of the frames thereof, a padding which is information for identification of the number of slots between the value S" and the value S"+1, and padding bit generation means for generating a padding synchronized with a period of variation of the padding and outputting the thus generated padding, the counter counting the number of slots or the number of bits to the position of the synchronism pattern of the next frame based on the generated padding generated by the padding bit generation means.

In the synchronous circuit, before 147 frames in the minimum or 293 frames in the maximum are inputted to the synchronous circuit, a padding is generated by the padding bit generation means in synchronism with the period of variation of the padding. Consequently, even if an error in padding information occurs in a transmission medium, a step-out condition from frames does not occur.

Further, even if an error in a layer; a bit rate or a sampling frequency, which are factors upon which the frame length depends other than the padding, occurs in a transmission medium after synchronism with frames is established, a step-out condition from frames does not occur.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 4 is a table illustrating a cycle of the padding;

FIG. 5 is a table illustrating a cycle of the padding for the layer 2 of the MPEG/Audio system when the bit rate is 192 kbps and the sampling frequency is 44.1 kHz;

DESCRIPTION OF THE PREFERRED EMBODIMENT

Figure 1:
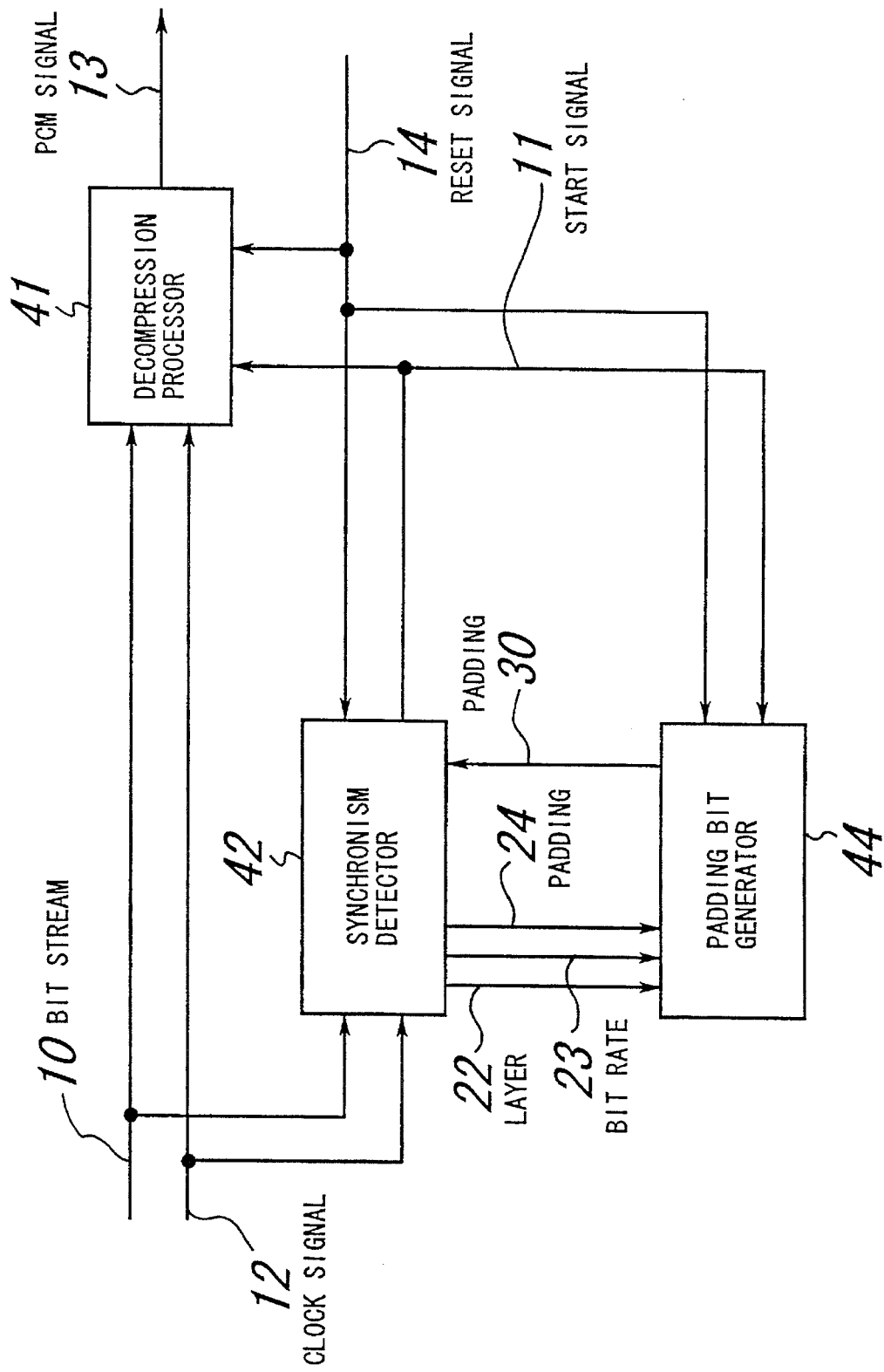
FIG. 1 is a block diagram of a synchronous circuit showing a preferred embodiment of the present invention.

Referring first to FIG. 1, there is shown in block diagram a synchronous circuit to which the present invention is applied. The synchronous circuit shown includes, in addition to a decompression processor 41 and a synchronism detector 42, a padding bit generator 44 for generating a padding bit for a frame being processed from a train of padding bits of a plurality of frames received in the past.

If the synchronism detector 42 detects a synchronism bit train from a bit stream 10 inputted thereto, then it outputs a start signal 11 to the decompression processor 41 and the padding bit generator 44 and outputs a layer 22, a bit rate 23 and a padding 24 to the padding bit generator 44. The padding bit generator 44 outputs a padding 30 to the synchronism detector 42. The decompression processor 41 starts decompression processing in response to the start signal 11 and outputs a PCM signal 13. The synchronism detector 42 outputs the start signal 11 for each one frame, and the decompression processor 41 performs processing of one frame in response to each such start signal 11.

Figure 2:
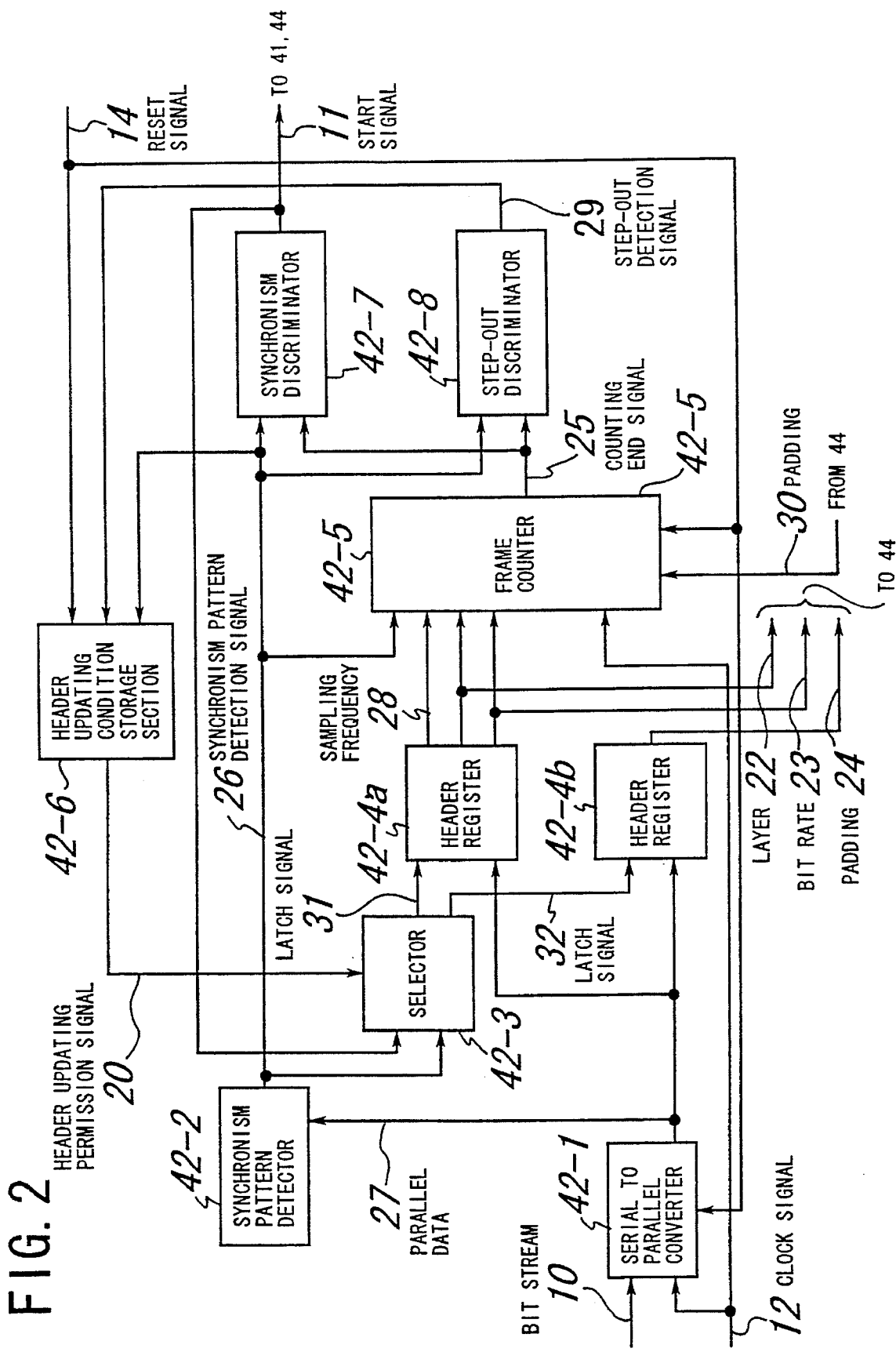
FIG. 2 is a block diagram showing a synchronism detector shown in FIG. 1.
Figure 7:
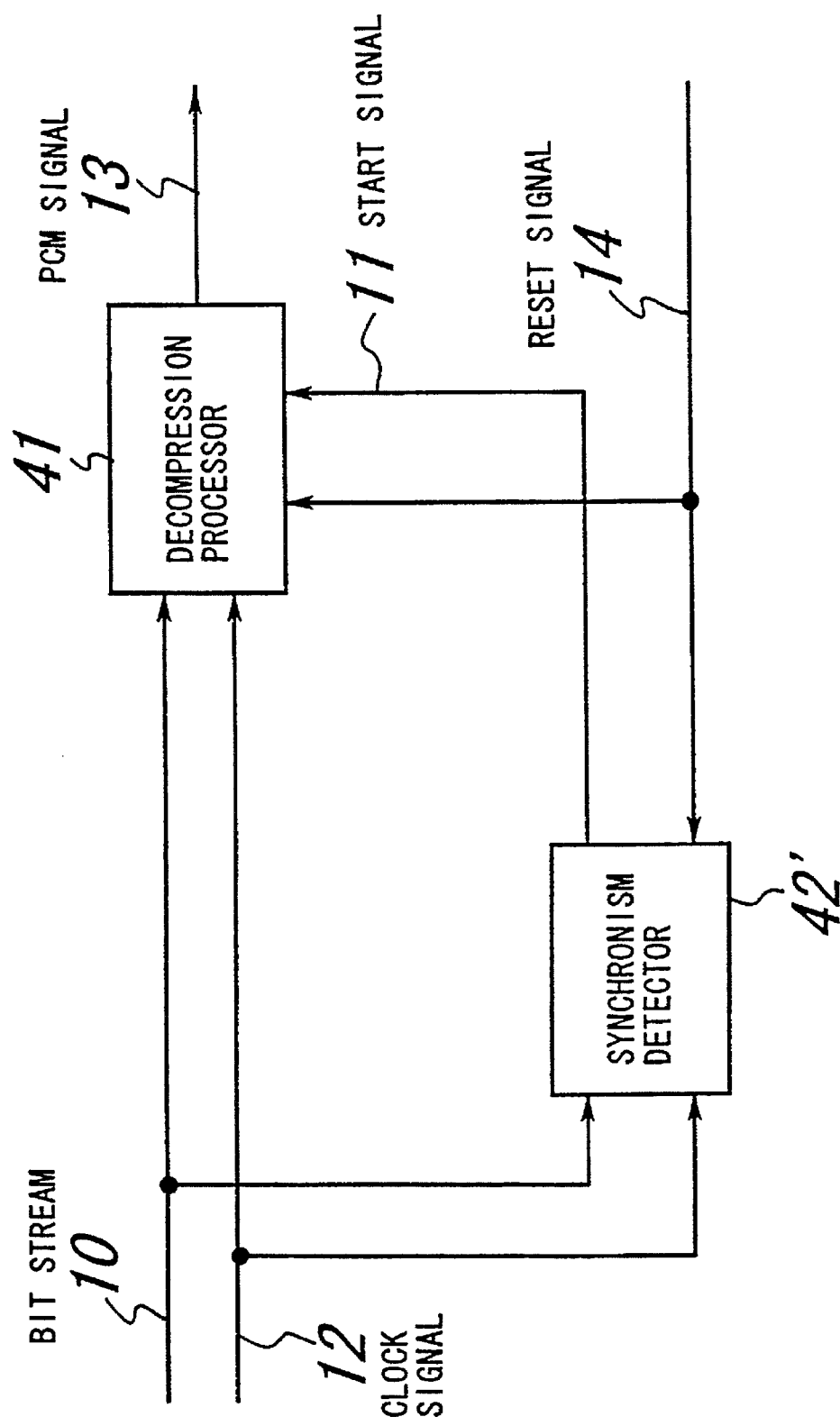
FIG. 7 is a block diagram showing a conventional synchronous circuit.
Figure 8:
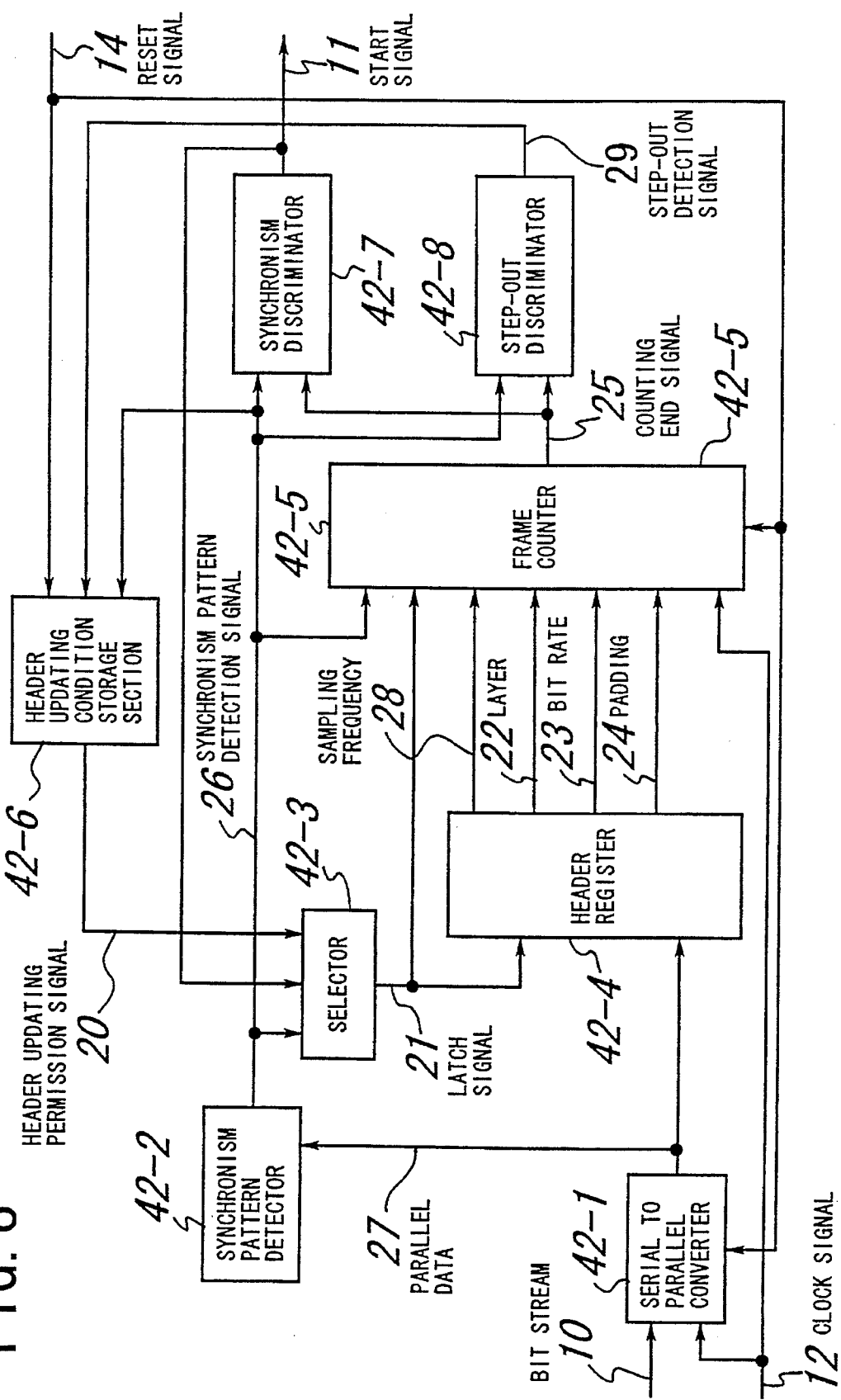
FIG. 8 is a block diagram of a synchronism detector shown in FIG. 7.

An internal construction of the synchronism detector 42 is shown in FIG. 2. Referring to FIG. 2, the synchronism detector 42 includes similar components to those of the conventional synchronism detector described hereinabove with reference to FIG. 7, but is different from the conventional synchronism detector in that it includes two first and second header registers 42-4a and 42-4b in place of the single header register 42-4 of the conventional synchronism detector of FIG. 8. As described hereinabove with reference to FIG. 8, the count value of the frame counter 42-5 is reset to 0, the parallel data 27 are reset to 0 and the header updating permission signal 20 is set in response to a reset signal 14.

A bit stream 10 is inputted as serial data to the synchronism detector 42 in synchronism with a clock signal 12, converted into parallel data 27 by the serial to parallel converter 42-1 and outputted to the synchronism pattern detector 42-2. The synchronism pattern detector 42-2 outputs a synchronism pattern detection signal 26 if a bit train conformable as data which form a header including a synchronism pattern prescribed in accordance with the MPEG/Audio system is inputted thereto. If the header updating permission signal 20 is in a set condition, then the selector 42-3 outputs the synchronism pattern detection signal 26 as a latch signal 31 to the first header register 42-4a and as another latch signal 32 to the second header register 42-4b. On the contrary if the header updating permission signal 20 is in a reset condition, then the selector 42-3 outputs a start signal 11 as the latch signal 32 to the second header register 42-4b, but does not output the latch signal 31.

In response to the latch signal 31 and the latch signal 32, a layer, a bit rate, a sampling frequency and a padding value which are values to determine a frame length to be outputted from the serial to parallel converter 42-1 are stored into the first header register 42-4a and the second header register 42-4b, respectively, and the frame counter 42-5 is reset to start counting of the number of clocks of the clock signal 12. Simultaneously, the header updating permission signal 20 is reset in response to the synchronism pattern detection signal 26.

After the header updating permission signal 20 is reset, the latch signal 31 from the selector 42-3 is not outputted any more to the first header register 42-4a, and consequently, the layer 22, the bit rate 23 and the sampling frequency 28 which are necessary to determine the frame length to be outputted from the first header register 42-4a are not thereafter updated. However, since the padding 24 may possibly vary between different frames, each time a start signal 11 is outputted, a latch signal 32 is outputted from the selector 42-3 to update the value of the padding 24.

The frame counter 42-5 counts the clock signal 12 until the count value thereof reaches a number of bits of the frame provided by the layer 22, the bit rate 23 and the sampling frequency 28 outputted from the first header register 42-4a and the padding 30 outputted from the padding bit generator 44. When the frame counter 42-5 completes the counting operation of one frame, it outputs a counting end signal 25. If a synchronism pattern detection signal 26 is outputted to the synchronism discriminator 42-7 simultaneously with the counting end signal 25, then the synchronism discriminator 42-7 outputs a start signal 11.

Figure 3:
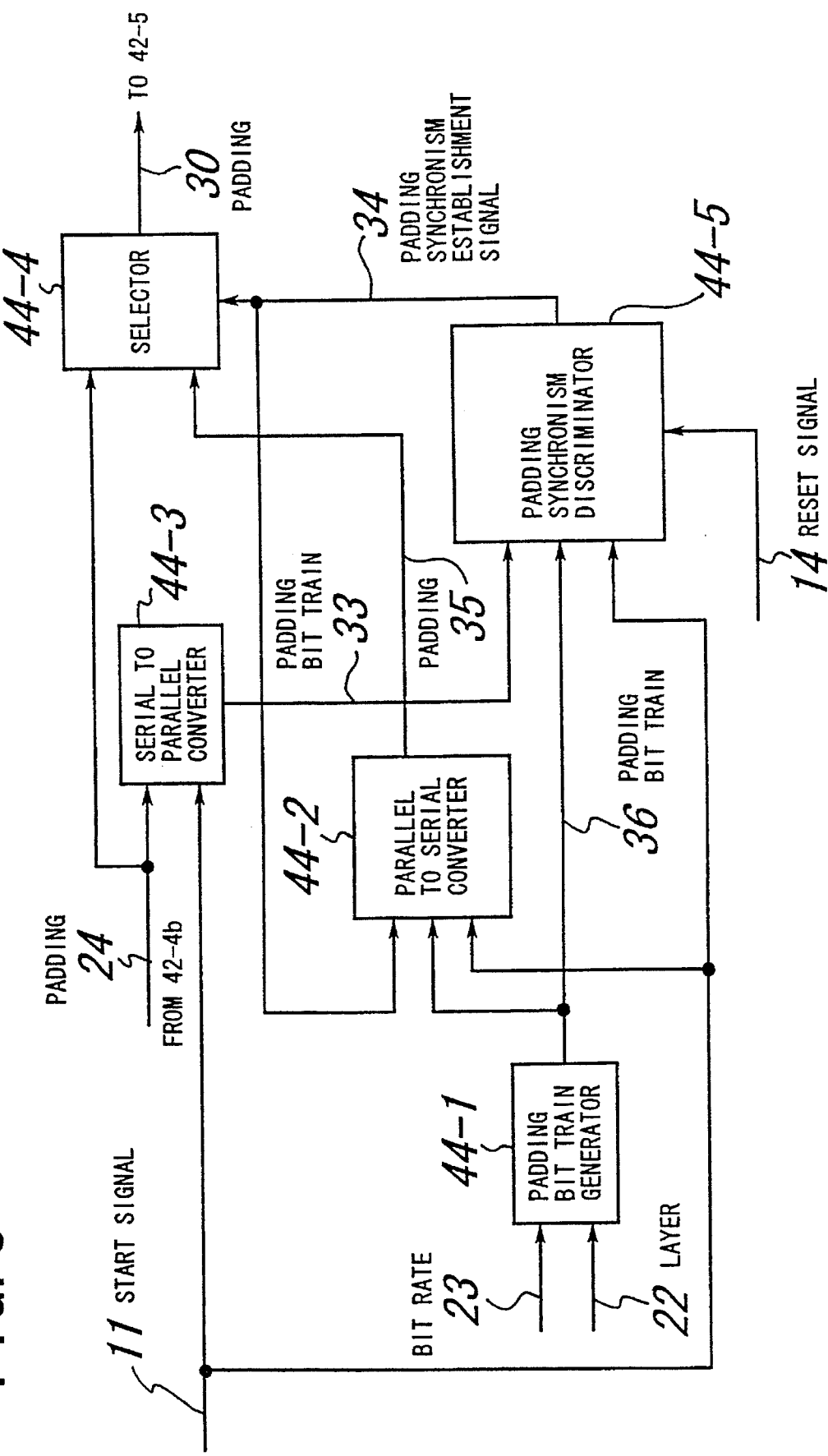
FIG. 3 is a block diagram of a padding bit generator shown in FIG. 1.

FIG. 3 shows a construction of the padding bit generator 44. Referring to FIG. 3, the padding bit generator 44 shown includes a padding bit train generator 44-1, a parallel to serial converter 44-2, a serial to parallel converter 44-3, a selector 44-4 and a padding synchronism discriminator 44-5.

In operation of the padding bit generator 44, the serial to parallel converter 44-3 fetches, in response to the start signal 11, the value of the padding 24 outputted from the synchronism detector 42. The serial to parallel converter 44-3 outputs data of 147 bits in conformity with a longest cycle of padding bits as hereinafter described. The selector 44-4 selects, if a padding synchronism establishment signal 34 is in a reset condition, a padding 35 outputted from the parallel to serial converter 44-2 and outputs it as a padding 30 (generated padding).

The padding has a periodicity which depends upon the layer, the bit rate and the sampling frequency as seen in FIG. 4. According to the MPEG/Audio system, since the padding is always equal to zero with a sampling frequency other than 44.1 kHz, only the periodicity when the sampling frequency is 44.1 kHz is illustrated in FIG. 4. As an example, a padding bit train when the layer is the layer 2, the bit rate is 192 kbps and the sampling frequency is 44.1 kHz is illustrated in FIG. 5.

The padding bit train generator 44-1 outputs a padding bit train 36 of 147 bits based on the layer 22 and the bit rate 23 from the synchronism detector 42. While the padding has a periodicity as described above, four different periods of 7, 21, 49 and 147 are available, and any of them can be represented as a bit train of a period of 147 frames. Consequently, since the period is 49 bits when the layer is the layer 2, the bit rate is 192 kbps and the sampling frequency is 44.1 kHz, the padding bit train generator 44-1 outputs a bit train for three periods with a width of 147 bits.

The padding synchronism discriminator 44-5 outputs a padding synchronism establishment signal 34 if the padding bit train 36 outputted from the padding bit train generator 44-1 and another padding bit train 33 outputted from the serial to parallel converter 44-3 coincide with each other after a start signal 11 is inputted by 147 times thereto. If the padding bit train 36 and the padding bit train 33 do not coincide with each other, then similar comparison processing is continued after a next start signal 11 is inputted. Since the padding bit train 33 has a maximum value of a period of 147 frames, when the 294th start signal 11 is outputted, the value of the padding bit train 33 has an equal value to that when the 147th start signal is inputted. Consequently, before the 293rd start signal 11 is outputted, the padding synchronism establishment signal 34 is outputted.

In response to the padding synchronism establishment signal 34, the parallel to serial converter 44-2 fetches an output value of the padding bit train generator 44-1. The parallel to serial converter 44-2 successively outputs bits of the thus fetched data beginning with the least significant bit in response to a start signal 11 and places the thus outputted data to the most significant bit of the data thereby to rotate the data in the direction toward the least significant bit. After the padding synchronism establishment signal 34 is outputted, the selector 44-4 outputs an output value of the parallel to serial converter 44-2 as a padding 30 to the synchronism detector 42.

Figure 6:
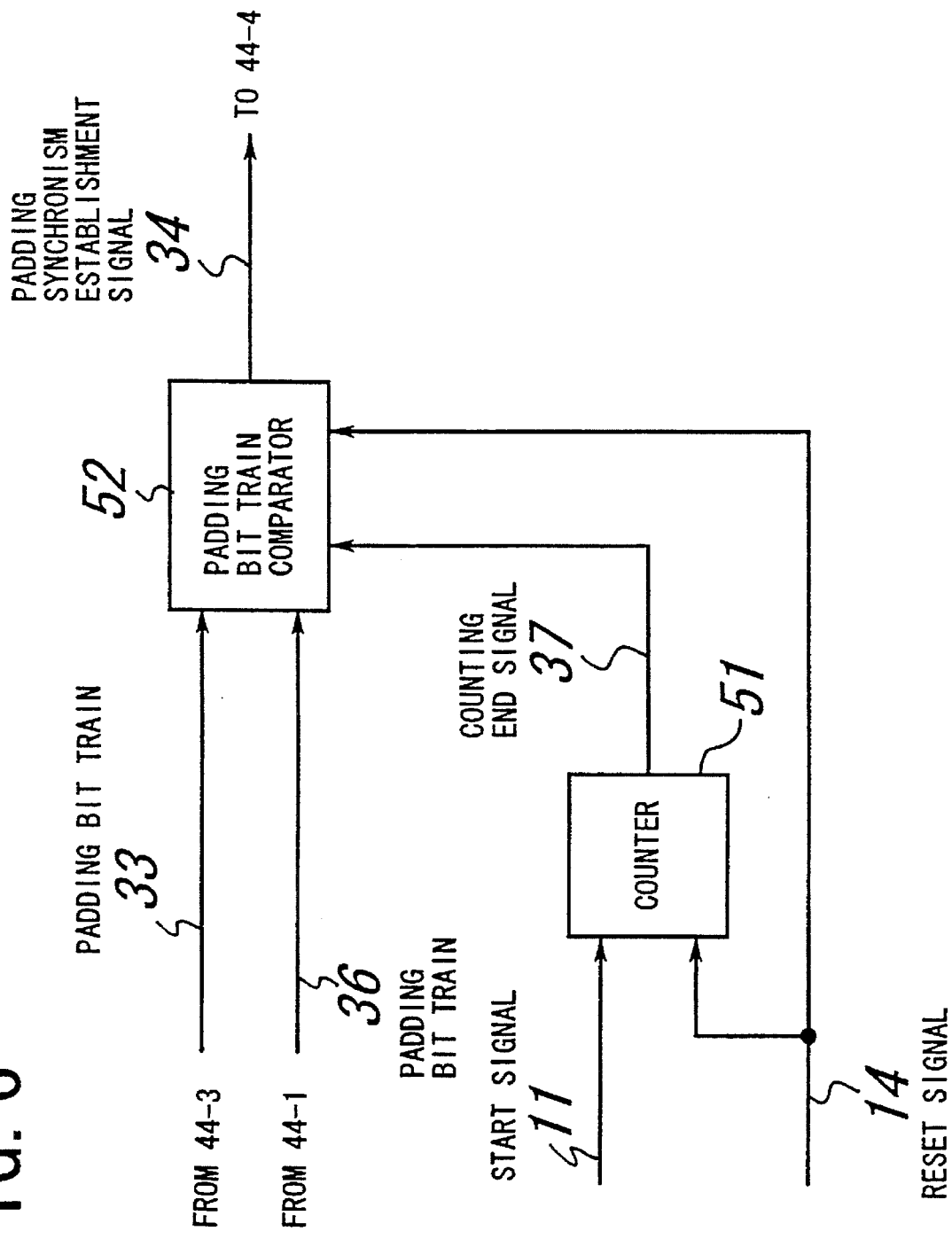
FIG. 6 is a block diagram of a padding synchronism discriminator shown in FIG. 3.

The padding synchronism discriminator 44-5 includes a counter 51 and a padding bit train comparator 52 as shown in FIG. 6. In the padding synchronism discriminator 44-5, the counter 51 counts the number of times by which an start signal 11 is inputted thereto, and outputs a counting end signal 37 when a start signal 11 is inputted thereto by 147 times. The counting end signal 37 is continued to be outputted until a reset signal 14 is inputted to the counter 51. After the counting end signal 37 is outputted, the padding bit train comparator 52 sets the padding synchronism establishment signal 34 if the padding bit train 33 outputted from the serial to parallel converter 44-3 and the padding bit train 36 outputted from the padding bit train generator 44-1 coincide with each other. The padding synchronism establishment signal 34 is reset when a reset signal 14 is inputted to the padding bit train comparator 52.

Subsequently, operation when an error in transmission occurs with any value based on which the frame length of the bit stream 10 is to be determined. If an error in transmission occurs with the padding 24, then after a padding synchronism establishment signal 34 is outputted, since a padding value outputted to the frame counter 42-5 is a value produced by the padding bit generator 44, it is not influenced by the error in transmission. Accordingly, a counting end signal 25 is generated at a same time as that at which it will be generated when no error occurs, and consequently, the synchronous condition is maintained.

The padding synchronism discriminator 44-5 in FIG. 5 is not influenced in operation thereof even if an error occurs with the padding 24 after the padding synchronism establishment signal 34 is outputted because the selector 44-4 selects the padding 30. If an error occurs with the padding 24 before padding synchronism is established, then additional time until the padding synchronism is established is required.

On the other hand, when an error occurs with the sampling frequency 28, the bit rate 23 or the layer 22, since a latch signal 31 is not outputted because the header updating permission signal 20 is in a reset condition after synchronism is established, the sampling frequency 28, the bit rate 23 and the layer 22 which are output values of the first header register 42-4a are not updated, and consequently, the padding value to be outputted to the frame counter 42-5 is not influenced by the error in transmission and the synchronous condition is still maintained.

Having now fully described the invention, it will be apparent to one of ordinary skill in the art that many changes and modifications can be made thereto without departing from the spirit and scope of the invention as set forth herein.

What is claimed is:

1. A synchronous circuit, comprising:

a synchronism detector including a synchronism pattern detector for detecting a synchronism pattern included in a bit stream of a bit rate Br formed from frames each composed of a plurality of slots as information units obtained by compression of a digital signal of a sampling frequency Fs by high efficiency coding, and a counter for counting a number of slots or a number of bits to a position of a synchronism pattern of a next frame based on frame length information included in said frame;

the bit stream including, when a value S' given by $$S' = (Br/N) \cdot (L/Fs)$$

is an integral number, frames each of which includes a number S of slots which is equal to the value S', N being a number of bits included in one slot, L being a number of samples of the digital signal of the sampling frequency Fs included in one frame of the bit stream, the bit stream including, when the value S' is not an integral number, a combination of frames wherein frames each of which includes a number of slots equal to an integral part S" of the value S' and frames each of which includes a number of slots equal to a number S"+1 which is a sum of the integral part S" of the value S' and 1 are combined so that the bit stream has an average bit rate approximated to the bit rate Br, the bit stream including, for each of the frames thereof, a padding which is information for identification of the number of slots between the value S" and the value S"+1; and padding bit generation means for generating a padding synchronized with a period of variation of the padding and outputting the thus generated padding;

said counter counting the number of slots or the number of bits to the position of the synchronism pattern of the next frame based on the generated padding generated by said padding bit generation means.

2. A synchronous circuit as claimed in claim 1, wherein said synchronism detector further includes a header register for storing information regarding a frame length of a frame only when a first synchronism pattern is received.

3. A synchronous circuit as claimed in claim 1 or 2, wherein said padding bit generation means includes a serial to parallel converter for fetching a padding outputted from said synchronism detector in response to a start signal outputted from said synchronism detector and outputting a padding bit train of a predetermined width in accordance with a maximum period of padding bits, a padding bit train generator for outputting a padding bit train of the predetermined width based on a layer and a bit rate outputted from said synchronism detector, a padding synchronism discriminator for comparing the padding bit train from said serial to parallel converter and the padding bit train from said padding bit train generator with each other to detect coincidence between them and outputting a padding synchronism establishment signal when coincidence is discriminated, a parallel to serial converter for fetching an output of said padding bit train generator in response to the padding synchronism establishment signal and outputting padding data, and a selector for selecting the padding data of said parallel to serial converter when the padding synchronism establishment signal is in a set condition but selecting the padding outputted from said synchronism detector when the padding synchronism establishment signal is in a reset condition and outputting the selected padding data or padding as the generated padding to said synchronism detector.

* * * * *